US012568487B2

(12) United States Patent
Yuan et al.

(10) Patent No.: US 12,568,487 B2
(45) Date of Patent: Mar. 3, 2026

(54) UPLINK CONTROL INFORMATION MULTIPLEXING FOR MULTIPLE PANELS

(71) Applicant: QUALCOMM Incorporated, San Diego, CA (US)

(72) Inventors: Fang Yuan, Beijing (CN); Mostafa Khoshnevisan, San Diego, CA (US); Wooseok Nam, San Diego, CA (US); Yitao Chen, San Diego, CA (US); Tao Luo, San Diego, CA (US); Xiaoxia Zhang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 656 days.

(21) Appl. No.: 18/000,228

(22) PCT Filed: Jul. 10, 2020

(86) PCT No.: PCT/CN2020/101219
§ 371 (c)(1),
(2) Date: Nov. 29, 2022

(87) PCT Pub. No.: WO2022/006833
PCT Pub. Date: Jan. 13, 2022

(65) Prior Publication Data
US 2023/0199758 A1     Jun. 22, 2023

(51) Int. Cl.
*H04W 72/1268*     (2023.01)
*H04W 72/21*     (2023.01)
*H04W 72/23*     (2023.01)

(52) U.S. Cl.
CPC ....... *H04W 72/1268* (2013.01); *H04W 72/21* (2023.01); *H04W 72/23* (2023.01)

(58) Field of Classification Search
CPC . H04W 72/1268; H04W 72/21; H04W 72/23; H04L 5/0044; H04L 5/0053;
(Continued)

(56) References Cited

U.S. PATENT DOCUMENTS

| 2012/0044889 A1* | 2/2012 | Jen | H04W 72/1268 |
| | | | 370/329 |
| 2014/0010182 A1* | 1/2014 | Chunli | H04L 5/0053 |
| | | | 370/329 |

(Continued)

FOREIGN PATENT DOCUMENTS

| CN | 108521885 A | 9/2018 |
| CN | 109906576 A | 6/2019 |
| CN | 110972286 A | 4/2020 |

OTHER PUBLICATIONS

Supplementary European Search Report—EP20944454—Search Authority—The Hague—Mar. 6, 2024.
(Continued)

*Primary Examiner* — Ayaz R Sheikh
*Assistant Examiner* — Tarell A Hampton
(74) *Attorney, Agent, or Firm* — Harrity & Harrity, LLP

(57)     ABSTRACT

Various aspects of the present disclosure generally relate to wireless communication. In some aspects, a user equipment (UE) may determine that a physical uplink control channel (PUCCH) transmitted on a first antenna panel of the UE is to overlap with a physical uplink shared channel (PUSCH) transmitted on a second antenna panel of the UE based at least in part on downlink control information (DCI) scheduling the PUCCH and the PUSCH. The UE may determine to transmit uplink control information (UCI) on one or more of the PUCCH or the PUSCH based at least in part on determining that the PUCCH is to overlap with the PUSCH, and transmit the UCI on one or more of the PUCCH or the PUSCH based at least in part on determining to transmit the
(Continued)

900 ⟶

UCI on one or more of the PUCCH or the PUSCH. Numerous other aspects are provided.

30 Claims, 15 Drawing Sheets

(58) Field of Classification Search
CPC ..... H04L 5/0094; H04L 5/005; H04L 5/0051; H04L 5/0055; H04L 27/2602; H04B 7/0617; H04B 7/0404; H04B 7/0691
See application file for complete search history.

(56) References Cited

U.S. PATENT DOCUMENTS

| | | | | |
|---|---|---|---|---|
| 2015/0271758 | A1* | 9/2015 | Park | H04L 5/0053 |
| | | | | 370/280 |
| 2016/0366576 | A1* | 12/2016 | You | H04J 11/0069 |
| 2018/0167933 | A1 | 6/2018 | Yin et al. | |
| 2019/0037586 | A1* | 1/2019 | Park | H04L 5/00 |
| 2019/0090212 | A1* | 3/2019 | Chou | H04W 48/08 |
| 2019/0342911 | A1 | 11/2019 | Talarico et al. | |
| 2019/0364561 | A1* | 11/2019 | Xiong | H04L 5/0051 |
| 2019/0379506 | A1 | 12/2019 | Cheng | |
| 2020/0128576 | A1 | 4/2020 | Jung et al. | |
| 2021/0068142 | A1* | 3/2021 | Park | H04W 72/0453 |
| 2021/0159966 | A1* | 5/2021 | Xi | H04W 72/046 |
| 2021/0168794 | A1* | 6/2021 | Zhang | H04L 5/0044 |
| 2022/0039122 | A1* | 2/2022 | Park | H04W 74/0841 |
| 2023/0027089 | A1* | 1/2023 | Pelletier | H04W 4/06 |
| 2023/0262608 | A1* | 8/2023 | Gao | H04W 52/08 |
| | | | | 455/522 |

OTHER PUBLICATIONS

International Search Report and Written Opinion—PCT/CN2020/101219—ISA/EPO—Apr. 9, 2021.
Qualcomm Incorporated: "Summary of Remaining Issues for UCI Multiplexing on PUSCH", 3GPP TSG RAN WG1 Meeting #92bis, 3GPP Draft; R1-1805666 Summary of Remaining Issues for UCI Multiplexing on PUSCH—Version 5, 3rd Generation Partnership Project (3GPP), Mobile Competence Centre, 650, Route Des Lucioles, F-06921 Sophia-Antipolis Cedex, France, vol. RAN WG1, No. Sanya, China; Apr. 16, 2018-Apr. 20, 2018, 10 Pages, Apr. 19, 2018, XP051427793, Apr. 20, 2018.

* cited by examiner

PDCCH

DL Data

UL Short
Burst Portion

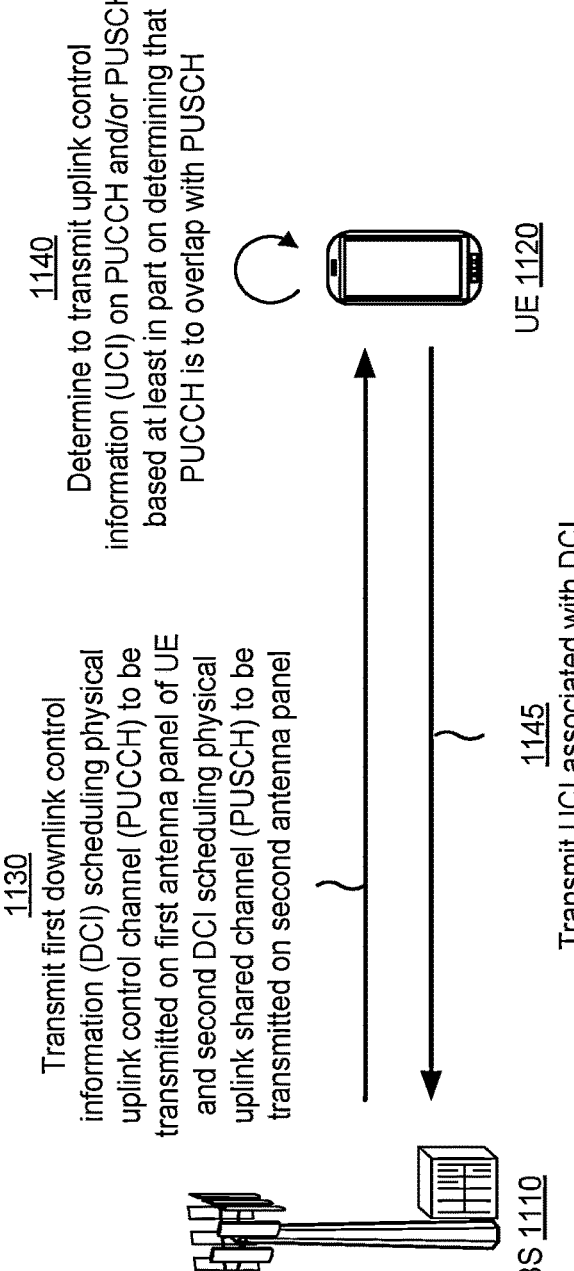

1135
Determine that PUCCH is to overlap with PUSCH based at least in part on DCI scheduling PUCCH and PUSCH 1140
Determine to transmit uplink control information (UCI) on PUCCH and/or PUSCH based at least in part on determining that PUCCH is to overlap with PUSCH 1130
Transmit first downlink control information (DCI) scheduling physical uplink control channel (PUCCH) to be transmitted on first antenna panel of UE and second DCI scheduling physical uplink shared channel (PUSCH) to be transmitted on second antenna panel

UE 1120

1145
Transmit UCI associated with DCI

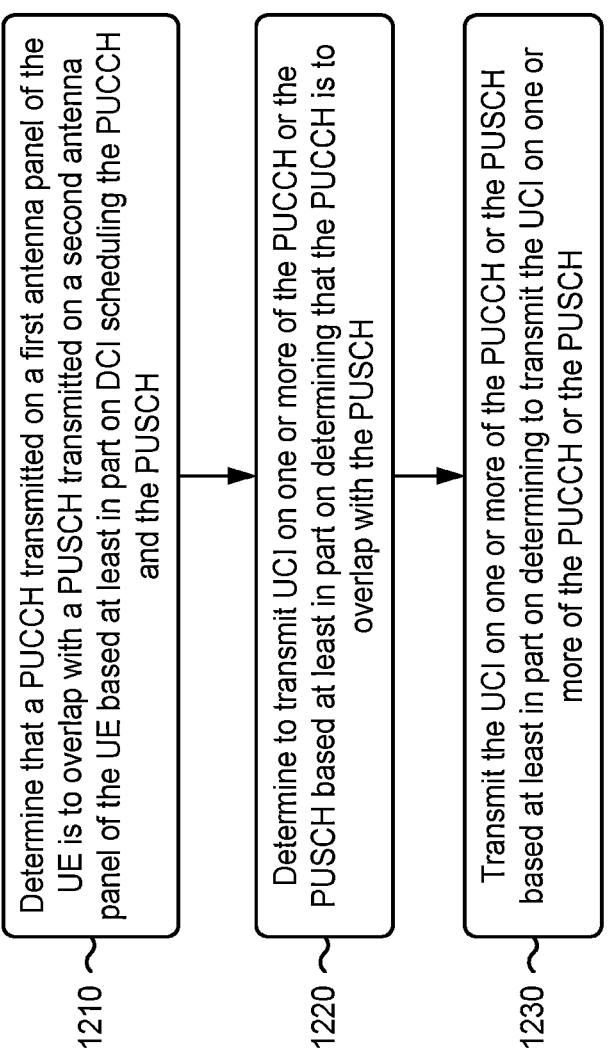

1210 — Determine that a PUCCH transmitted on a first antenna panel of the UE is to overlap with a PUSCH transmitted on a second antenna panel of the UE based at least in part on DCI scheduling the PUCCH and the PUSCH 1220 — Determine to transmit UCI on one or more of the PUCCH or the PUSCH based at least in part on determining that the PUCCH is to overlap with the PUSCH 1230 — Transmit the UCI on one or more of the PUCCH or the PUSCH based at least in part on determining to transmit the UCI on one or more of the PUCCH or the PUSCH

Transmit first DCI scheduling a PUCCH to be transmitted on a first antenna panel of a UE and second DCI scheduling a PUSCH to be transmitted on a second antenna panel of the UE, where the PUCCH is to overlap with the PUSCH

1320

Receive UCI associated with the first DCI and the second DCI on one of the PUCCH or the PUSCH

UPLINK CONTROL INFORMATION MULTIPLEXING FOR MULTIPLE PANELS

CROSS-REFERENCE TO RELATED APPLICATION

This Patent Application is a 371 national stage of PCT Application No. PCT/CN2020/101219 filed on Jul. 10, 2020, entitled "UPLINK CONTROL INFORMATION MULTIPLEXING FOR MULTIPLE PANELS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for multiplexing uplink control information for a us equipment with multiple antenna panels.

BACKGROUND

Wireless communication systems are widely deployed to provide various telecommunication services such as telephony, video, data, messaging, and broadcasts Typical wireless communication systems may employ multiple-access technologies capable of supporting communication with multiple users by sharing available system resources (e.g., bandwidth, transmit power, and/or the like). Examples of such multiple access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes determining that a physical uplink control channel (PUCCH) transmitted on a first antenna panel of the UE is to overlap with a physical uplink shared channel (PUSCH) transmitted on a second antenna panel of the UE based at least in part on downlink control information (DCI) scheduling the PUCCH and the PUSCH. The method also includes determining to transmit uplink control information (UCI) on one or more of the PUCCH or the PUSCH based at least in part on determining that the PUCCH is to overlap with the PUSCH, and transmitting the UCI on one or more of the PUCCH or the PUSCH based at least in part on determining to transmit the UCI on one or more of the PUCCH or the PUSCH.

In some aspects, a method of wireless communication performed by a base station includes transmitting first DCI scheduling a PUCCH to be transmitted on a first antenna panel of a UE and second DCI scheduling a PUSCH to be transmitted on a second antenna panel of the UE, where the PUCCH is to overlap with the PUSCH, and receiving UCI associated with the first DCI and the second DCI on one of the PUCCH or the PUSCH.

In some aspects, a UE for wireless communication includes a memory and one or more processors operatively coupled to the memory, the memory and the one or more processors configured to determine that a PUCCH transmitted on a first antenna panel of the UE is to overlap with a PUSCH transmitted on a second antenna panel of the UE based at least in part on DCI scheduling the PUCCH and the PUSCH, determine to transmit UCI on one or more of the PUCCH or the PUSCH based at least in part on determining that the PUCCH is to overlap with the PUSCH, and transmit the UCI on one or more of the PUCCH or the PUSCH based at least in part on determining to transmit the UCI on one or more of the PUCCH or the PUSCH.

In some aspects, a base station for wireless communication includes a memory and one or more processors operatively coupled to the memory, the memory and the one or more processors configured to transmit first DCI scheduling a PUCCH to be transmitted on a first antenna panel of a UE and second DCI scheduling a PUSCH to be transmitted on a second antenna panel of the UE, where the PUCCH is to overlap with the PUSCH, and receive UCI associated with the first DCI and the second DCI on one of the PUCCH or the PUSCH.

In some aspects, a non-transitory computer-readable medium storing a set of instructions for wireless communication includes one or more instructions that, when executed by one or more processors of a UE, cause the UE to determine that a PUCCH transmitted on a first antenna panel of the UE is to overlap with a PUSCH transmitted on a second antenna panel of the UE based at least in part on DCI scheduling the PUCCH and the PUSCH, determine to transmit UCI on one or more of the PUCCH or the PUSCH based at least in part on determining that the PUCCH is to overlap with the PUSCH, and transmit the UCI on one or more of the PUCCH or the PUSCH based at least in part on determining to transmit the UCI on one or more of the PUCCH or the PUSCH.

In some aspects, a non-transitory computer-readable medium storing a set of instructions for wireless communication includes one or more instructions that, when executed by one or more processors of a base station, cause the base station to transmit first DCI scheduling a PUCCH to be transmitted on a first antenna panel of a UE and second DCI scheduling a PUSCH to be transmitted on a second antenna panel of the UE, where the PUCCH is to overlap with the PUSCH, and receive UCI associated with the first DCI and the second DCI on one of the PUCCH or the PUSCH.

In some aspects, an apparatus for wireless communication includes means for determining that a PUCCH transmitted on a first antenna panel of the apparatus is to overlap with a PUSCH transmitted on a second antenna panel of the apparatus based at least in part on DCI scheduling the PUCCH and the PUSCH, means for determining to transmit UCI on one or more of the PUCCH or the PUSCH based at least in part on determining that the PUCCH is to overlap with the PUSCH, and means for transmitting the UCI on one or more of the PUCCH or the PUSCH based at least in part on determining to transmit the UCI on one or more of the PUCCH or the PUSCH.

In some aspects, an apparatus for wireless communication includes means for transmitting first DCI scheduling a PUCCH to be transmitted on a first antenna panel of a UE and second DCI scheduling a PUSCH to be transmitted on a second antenna panel of the UE, where the PUCCH is to overlap with the PUSCH, and means for receiving UCI associated with the first DCI and the second DCI on one of the PUCCH or the PUSCH.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 illustrates an example of multiplexing UCI for a UE with multiple antenna panels, in accordance with various aspects of the present disclosure.

FIG. 12 is a diagram illustrating an example process performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
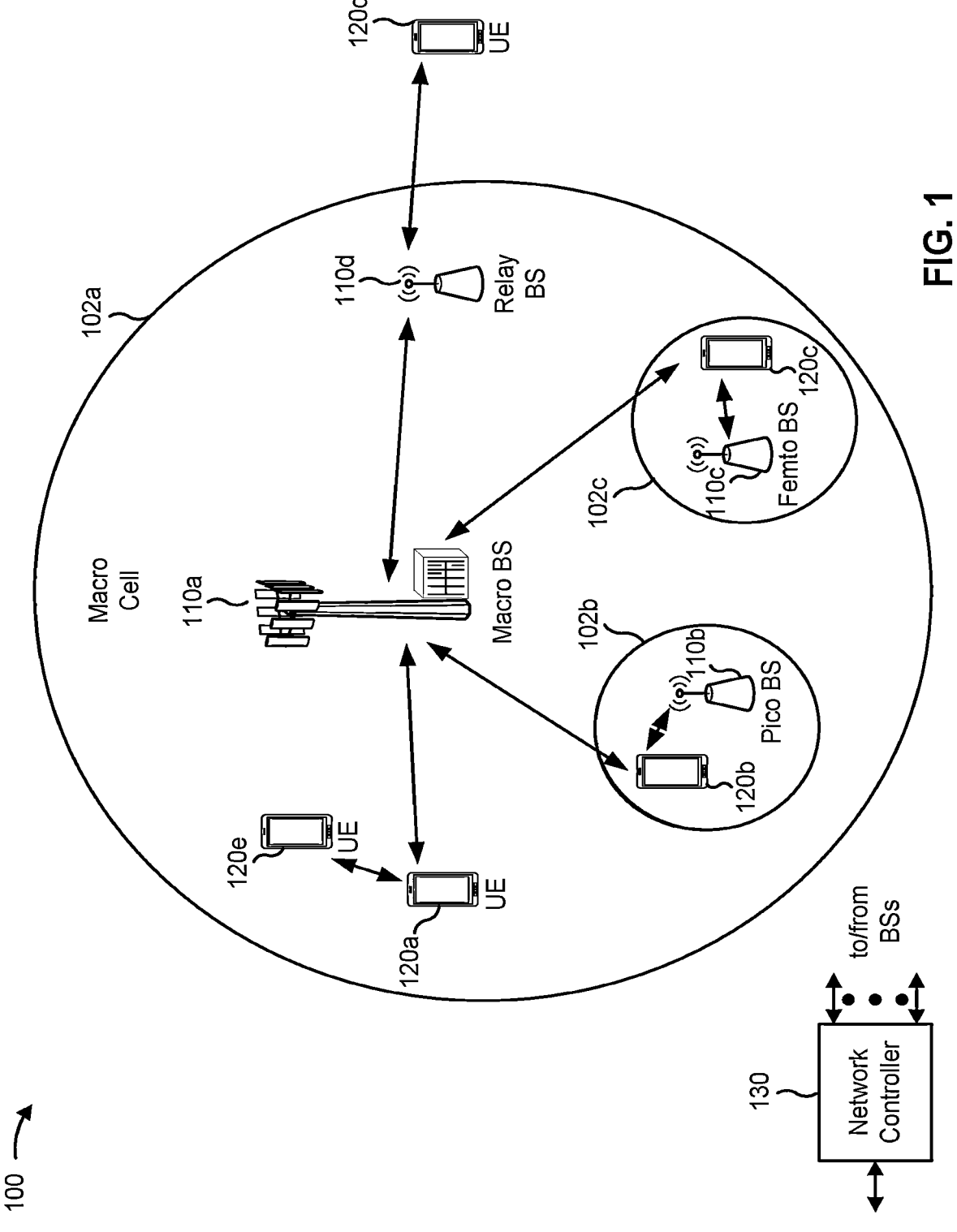
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
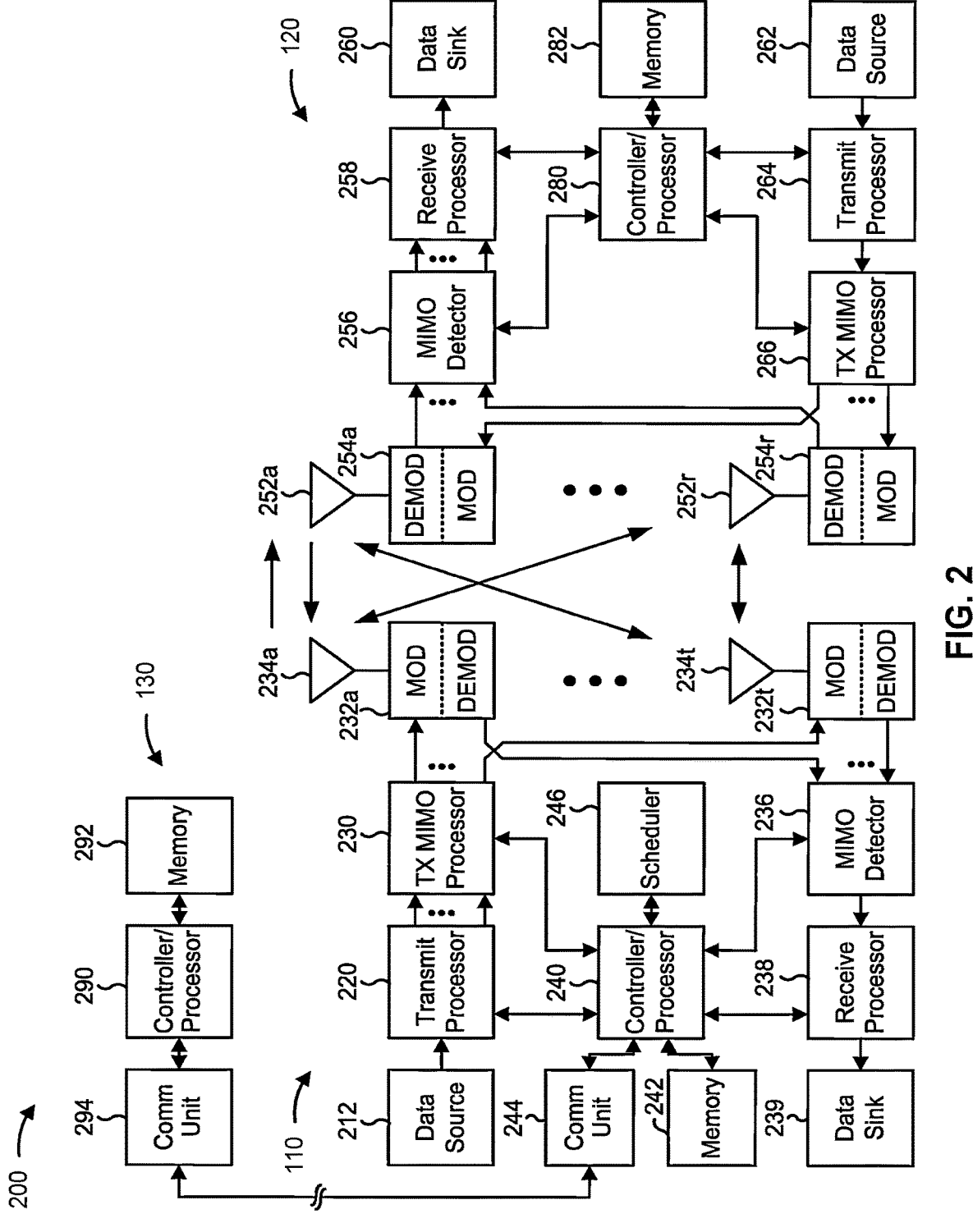
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate)

the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-15.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-15.

Controller/processor 240 of base station 110, controller/processor 280 of UE 120, and/or any other component(s) of FIG. 2 may perform one or more techniques associated with multiplexing uplink control information (UCI) for a UE with multiple antenna panels, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1200 of FIG. 12, process 1300 of FIG. 13, and/or other processes as described herein. In some aspects, executing instructions may include running the instructions, converting the instructions, compiling the instructions, interpreting the instructions, and/or the like.

In some aspects, UE 120 may include means for determining that a physical uplink control channel (PUCCH) transmitted on a first antenna panel of the UE is to overlap with a physical uplink shared channel (PUSCH) transmitted on a second antenna panel of the UE based at least in part on downlink control information (DCI) scheduling the PUCCH and the PUSCH, means for determining to transmit UCI on one or more of the PUCCH or the PUSCH based at least in part on determining that the PUCCH is to overlap with the PUSCH, means for transmitting the UCI on one or more of the PUCCH or the PUSCH based at least in part on determining to transmit the UCI on one or more of the PUCCH or the PUSCH, and/or the like. In some aspects, such means may include one or more components of UE 120 described in connection with FIG. 2, such as controller/processor 280, transmit processor 264, TX MIMO processor

266, MOD 254, antenna 252, DEMOD 254, MIMO detector 256, receive processor 258, and/or the like.

In some aspects, base station 110 may include means for transmitting first DCI scheduling a PUCCH to be transmitted on a first antenna panel of a UE and second DCI scheduling a PUSCH to be transmitted on a second antenna panel of the UE, where the PUCCH is to overlap with the PUSCH, means for receiving UCI associated with the first DCI and the second DCI on one of the PUCCH or the PUSCH, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
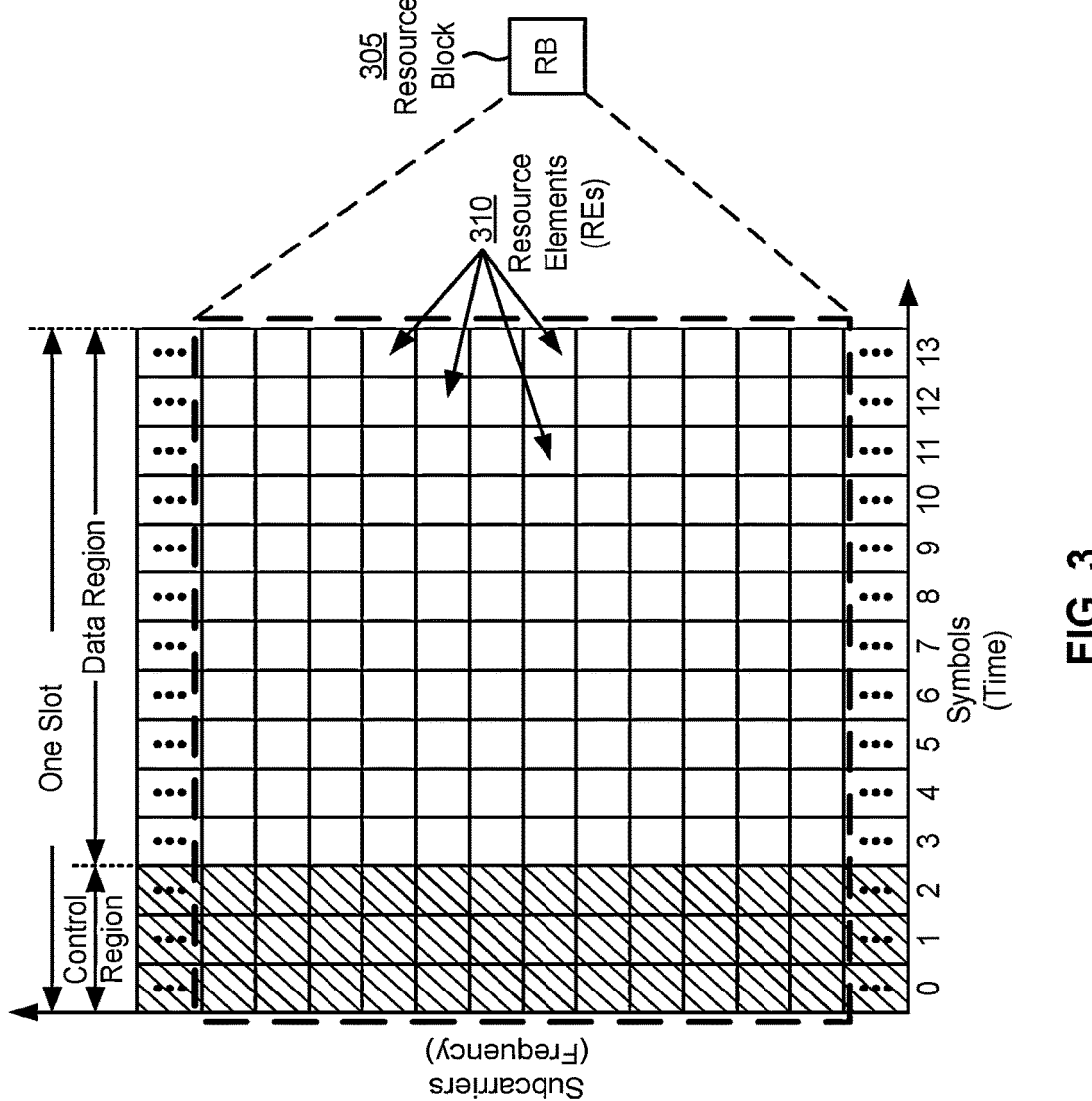
FIG. 3 is a diagram illustrating an example of a slot format, in accordance with various aspects of the present disclosure.

FIG. 3 is a diagram illustrating an example 300 of a slot format, in accordance with various aspects of the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable by a base station 110 as a unit. In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing, a cyclic prefix format, and/or the like). A slot may be configured with a link direction (e.g., downlink or uplink) for transmission. In some aspects, the link direction for a slot may be dynamically configured. In some communications systems, such as 5G or NR, a UE may transmit a communication to a base station on a physical uplink channel (e. g., a PUCCH, a PUSCH, and/or the like) in one or more slots.

As indicated above, FIG. 3 is provided as an example. Other examples may differ from what is described with respect to FIG. 3.

Figure 4:
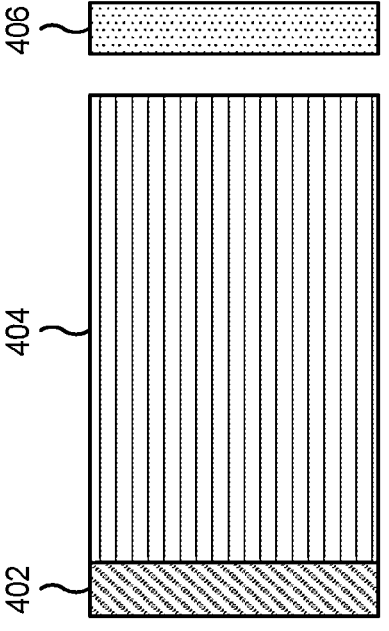
FIG. 4 is a diagram showing an example of a downlink-centric slot or wireless communication structure, in accordance with various aspects of the present disclosure.

FIG. 4 is a diagram 400 showing an example of a downlink (DL)-centric slot or wireless communication structure, in accordance with various aspects of the present disclosure. The DL-centric slot may include a control portion 402. The control portion 402 may exist in the initial or beginning portion of the DL-centric slot. The control portion 402 may include various scheduling information and/or control information corresponding to various portions of the DL-centric slot. In some configurations, the control portion 402 may be a physical downlink control channel (PDCCH), as indicated in FIG. 4. In some aspects, the control portion 402 may include legacy PDCCH information, shortened PDCCH (sPDCCH) information, a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 404. The DL data portion 404 may sometimes be referred to as the payload of the DL-centric slot. The DL data portion 404 may include the communication resources utilized to communicate DL data from the scheduling entity (e.g., UE or BS) to the subordinate entity (e.g., UE). In some configurations, the DL data portion 404 may be a physical DL shared channel (PDSCH).

The DL-centric slot may also include an uplink (UL) short burst portion 406. The UL short burst portion 406 may sometimes be referred to as an UL burst, an UL burst portion, a common UL burst, a short burst, an UL short burst, a common UL short burst, a common UL short burst portion, and/or various other suitable terms. In some aspects, the UL short burst portion 406 may include one or more reference signals. Additionally, or alternatively, the UL short burst portion 406 may include feedback information corresponding to various other portions of the DL-centric slot. For example, the UL short burst portion 406 may include feedback information corresponding to the control portion 402 and/or the data portion 404. Non-limiting examples of information that may be included in the UL short burst portion 406 include an acknowledgement (ACK) signal (e.g., a PUCCH ACK, a PUSCH ACK, an immediate ACK), a negative acknowledgement (NACK) signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 406 may include additional or alternative information, such as information pertaining to random access channel (RACH) procedures, scheduling requests, and various other suitable types of information.

As illustrated in FIG. 4, the end of the DL data portion 404 may be separated in time from the beginning of the UL short burst portion 406. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 4 is provided as an example. Other examples may differ from what is described with regard to FIG. 4.

Figure 5:
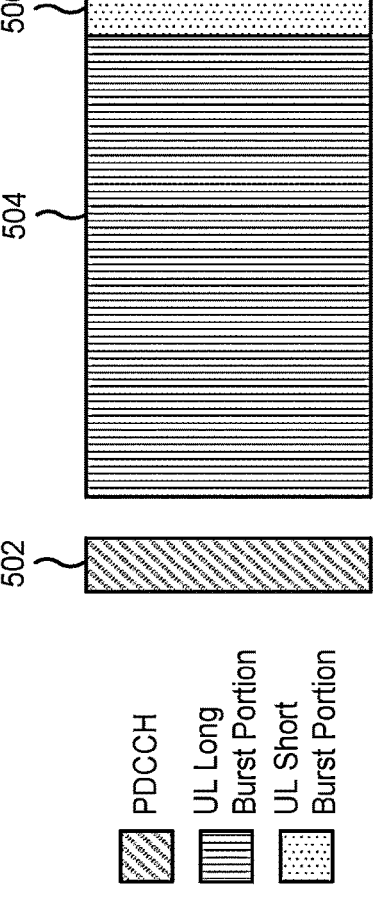
FIG. 5 is a diagram showing an example of an uplink-centric slot or wireless communication structure, in accordance with various aspects of the present disclosure.

FIG. 5 is a diagram 500 showing an example of an UL-centric slot or wireless communication structure, in accordance with various aspects of the present disclosure. The UL-centric slot may include a control portion 502. The control portion 502 may exist in the initial or beginning portion of the UL-centric slot. The control portion 502 in FIG. 5 may be similar to the control portion 502 described above with reference to FIG. 5. The UL-centric slot may also include an UL long burst portion 504. The UL long burst portion 504 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 502 may be a PDCCH.

As illustrated in FIG. 5, the end of the control portion 502 may be separated in time from the beginning of the UL long burst portion 504. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 506. The UL short burst portion 506 in FIG. 5 may be similar to the UL short burst portion 406 described above with reference to FIG. 4, and may include any of the information described above in connection with FIG. 4. The foregoing is one example of an UL-centric wireless communication structure, and alternative structures having similar features may exist without necessarily deviating from the aspects described herein.

As indicated above, FIG. 5 is provided as an example. Other examples may differ from what is described with regard to FIG. 5.

Figure 6:
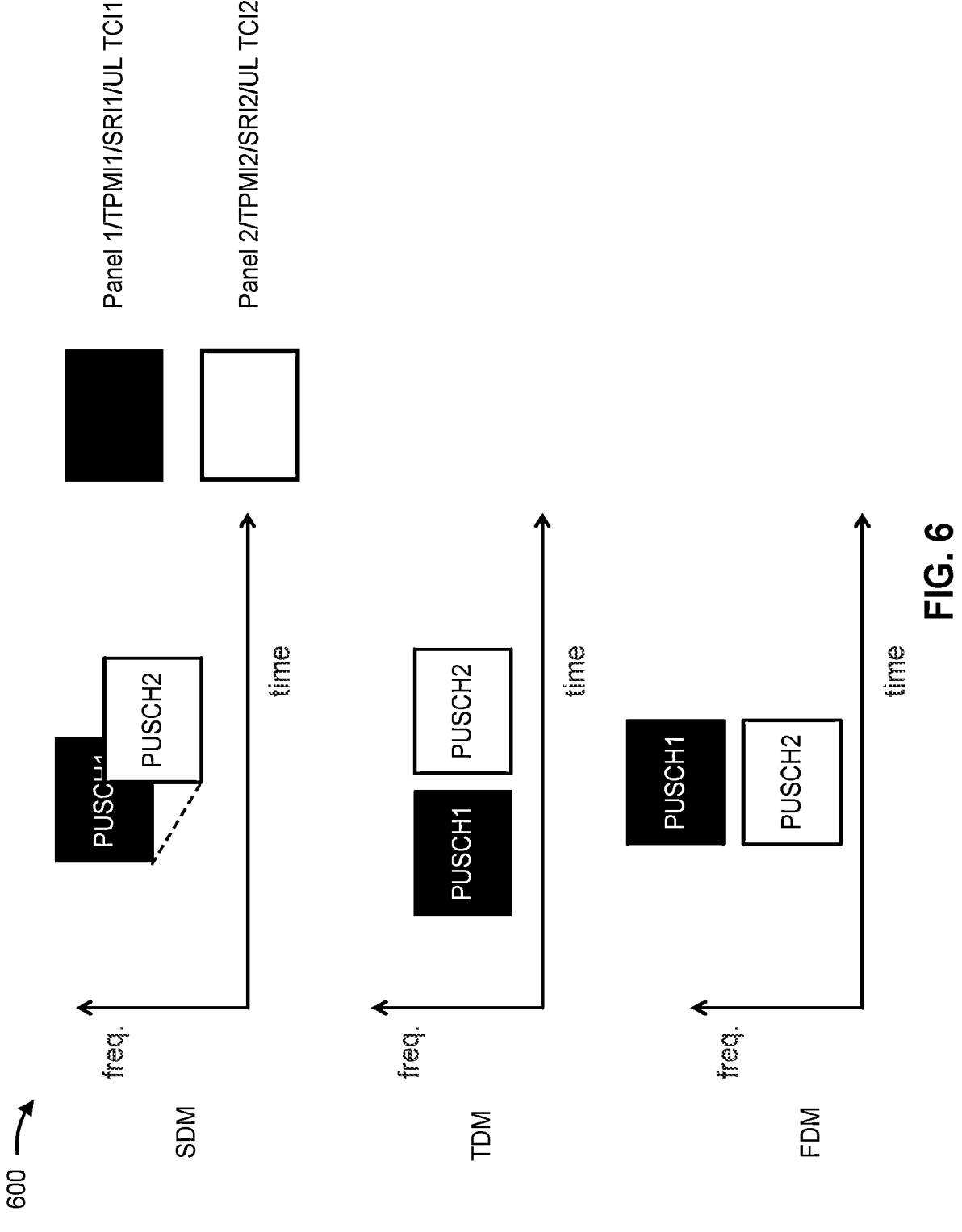
FIG. 6 illustrates an example of transmissions with multiple antenna panels, in accordance with various aspects of the present disclosure.

FIG. 6 illustrates an example 600 of transmissions with multiple antenna panels, in accordance with various aspects of the present disclosure.

A UE may use multiple antenna panels for transmission or reception, and each antenna panel may be distinguished from the other antenna panel using different kinds of information. Although an antenna panel or an antenna panel identifier (ID) is used herein for purposes of discussion, the antenna panel may be associated with a set of signals or channels, and correspondingly, the antenna panel ID may be derived or associated with the set of signals or channel IDs. For example, a control resource set (CORESET) may be configured with a CORESET pool index. A first antenna panel may be associated with DCI in a CORESET with a first CORESET pool index value (e.g., 0) and a second antenna panel may be associated with DCI in a CORESET with a second CORESET pool index value (e.g., 1). Other information may be used to distinguish antenna panels. An SRS set ID or SRS resource ID may be associated with the first antenna panel and another SRS set ID or SRS resource ID may be associated with the second antenna panel. A beam ID or beam group ID may be associated with the first antenna panel, and another beam ID or beam group ID may be associated with the second antenna panel.

The beam may be configured with a transmission configuration indication (TCI) state or a spatial filter setting for either downlink reception or uplink transmission, or the beam may be configured with spatial relation information indicated for transmitting uplink signals. In some aspects, the beam may be indicated by a reference signal (RS) such as synchronization signal block (SSB), a channel state information RS (CSI-RS), or an SRS. When a set of beam IDs are configured, a first half of the set of beam IDs may be associated with the first antenna panel, and the second half of the set of beam IDs may be associated with the second antenna panel. When a pair of TCI states are indicated in the DCI, the first TCI state ID in the pair may be associated with the first antenna panel, and the second TCI state ID in the pair may be associated with the second panel.

Other information may be used to indicate antenna panels. For example, an uplink transmit power control configuration may include a close loop index, and a first close loop index value (e.g., 0) may be associated with the first antenna panel and a second close loop index value (e.g., 1) may be associated with the second antenna panel. An antenna port ID or antenna port group ID may be associated with the first antenna panel, and another antenna port ID or antenna port group ID may be associated with the second antenna panel, where the antenna port may include but is not limited to a PUSCH antenna port, an SRS antenna port, and a phase tracking RS antenna port. A DMRS code division multi-plexing (CDM) group ID may be associated with the first antenna panel, and another DMRS CDM group ID may be associated with the second antenna panel. A timing advance group (TAG) ID may be associated with the first antenna panel, and another TAG ID may be associated with the second antenna panel. A PUCCH resource ID or resource group ID may be associated with the first antenna panel, and another PUCCH resource ID or resource group ID may be associated with the second antenna panel. When a set of PUCCH resource IDs are configured, the first half of the set of PUCCH resource IDs may be associated with the first antenna panel, and the second half of the set of PUCCH resource IDs may be associated with the second antenna panel. A radio network temporary identifier (RNTI) may be associated with the first antenna panel, and another RNTI may be associated with the second antenna panel. A physical cell identity (PCI) or synchronization signal block (SSB) set ID may be associated with the first antenna panel, and another PCI or SSB set ID may be associated with the second antenna panel. By indicating the signal or channel IDs, the associated panel can be indicated, and the corre-sponding panel ID can be indicated.

FIG. 6 shows examples of a UE that is to transmit multiple PUSCHs with a same cell index and or a same starting time. The UE may use spatial division multiplexing (SDM) to transmit PUSCHs (e.g., PUSCH1, PUSCH2 shown in FIG. 6) with different transmitted precoding matrix indicators (TPMIs), spatial relation information (SRI), and/or trans-mission configuration indicator (TCI) for each panel. The UE may use time division multiplexing (TDM) to transmit PUSCH1 before PUSCH2. The UE may use frequency division multiplexing (FDM) to transmit PUSCH1 and PUSCH2 at the same time but in different frequency bands.

As indicated above, FIG. 6 is provided as an example. Other examples may differ from what is described with regard to FIG. 6.

Figure 7:
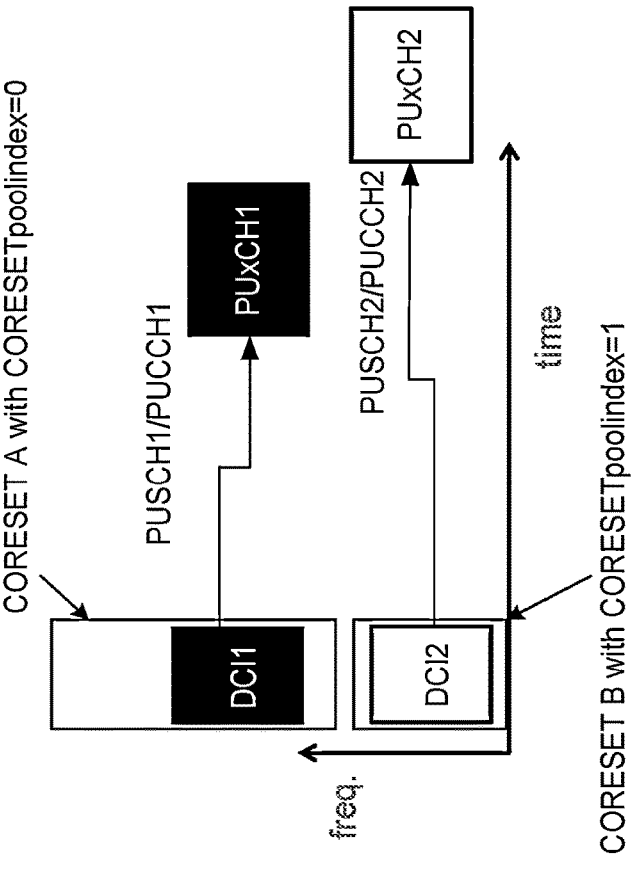
FIG. 7 illustrates an example of transmissions with multiple antenna panels, in accordance with various aspects of the present disclosure.

FIG. 7 illustrates an example 700 of transmissions with multiple antenna panels, in accordance with various aspects of the present disclosure. FIG. 7 shows how different CORE-SET pool indices may be used to differentiate multiple TRPs or multiple antenna panels.

A UE may use multiple panels for transmissions to multiple TRPs or receptions from multiple TRPs. PUCCH/PUSCH collisions from different panels may be avoided by various techniques, and the UE does not expect overlapping PUCCH/PUSCH transmissions toward different TRPs. For PUCCH/PUSCH transmissions toward the same TRP, Release 15 multiplexing rules may apply, such as described in connection with FIG. 6. In some aspects, PUCCH resources may be associated with CORESETs, and these CORESETs may be used to differentiate between TRPs, in order to determine whether there are overlapping PUCCH/

PUSCH transmissions among TRPs. PUSCHs may be asso-ciated with TRPs and differentiated by scheduling CORE-SETs for targeted TRPs. For example, FIG. 7 shows first DCI, which schedules PUSCH1 or PUCCH1, may be located in CORESET A with CORESET pool index value 0, and second DCI, which schedules PUSCH2 or PUCCH2, may be located in CORESET B with CORESET pool index value 1. In FIG. 7, PUxCH1 represents either PUSCH1 or PUCCH1. Therefore, the first DCI may be associated with the first TRP and the second DCI may be associated with the second TRP, and correspondingly, the PUSCH1 or PUCCH1 may be associated with the first TRP and the PUSCH2 or PUCCH2 may be associated with a second TRP.

As indicated above, FIG. 7 is provided as an example. Other examples may differ from what is described with regard to FIG. 7.

Figure 8:
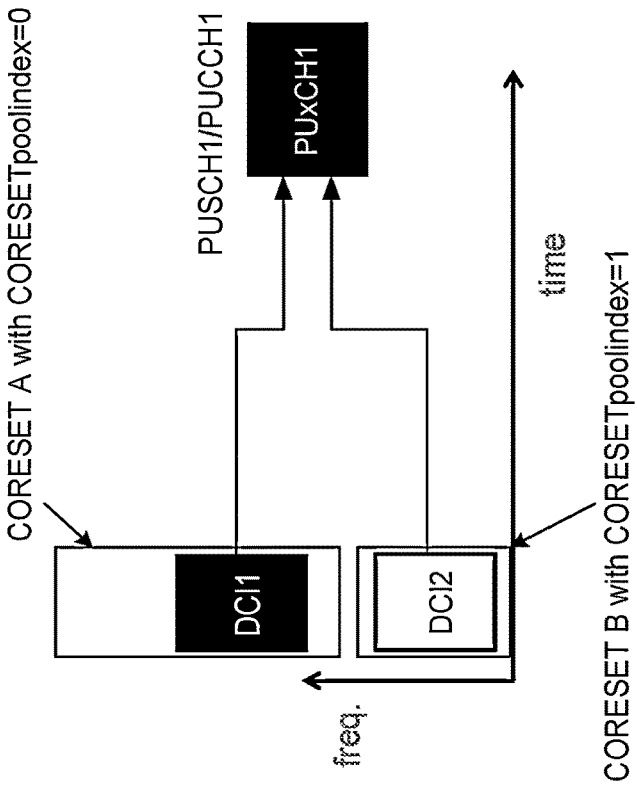
FIG. 8 illustrates an example of transmissions with multiple antenna panels, in accordance with various aspects of the present disclosure.

FIG. 8 illustrates an example 800 of transmissions with multiple antenna panels, in accordance with various aspects of the present disclosure. FIG. 8 shows joint feedback for a first DCI (DCI1) and a second DCI (DCI2).

If a UE is provided first DCI (DCI1) in a CORESET with a CORESET pool index value of 0 and second DCI (DCI2) in a CORESET with a CORESET pool index value of 1 (e.g., each of first and second DCI schedules a PDSCH transmission), the UE may provide joint ACK/NACK for both the first DCI associated with the first TRP and the second DCI associated with the second TRP, where UCI of ACK/NACK for the first DCI associated with the first TRP and UCI of ACK/NACK for the second DCI associated with the second TRP are transmitted jointly in one uplink chan-nel. If the first DCI associated with the first TRP is for scheduling PUSCH, and the second DCI associated with the second TRP is for scheduling PUCCH, the UE may transmit the UCI of ACK/NACK associated with different TRPs in a single uplink channel, either by the PUSCH, or by the PUCCH. For example, PUxCH1 in FIG. 8 represents UCI is transmitted on either PUSCH1 or PUCCH1.

The UE may transmit on uplink channels using multiple panels. For example, the UE may transmit the UCI associ-ated with both TRPs on a joint PUCCH from any of the multiple panels of the UE. The UE may also transmit on one or more PUSCHs from one or more of the multiple panels. The UE may have to transmit UCI on one or more these uplink channels. However, it has not been specified on which channel or channels the UE is to transmit the UCI when there are PUCCH/PUSCH transmissions on multiple panels. Without clear directions for UCI transmission in association with transmission on multiple panels, the UE may not effectively communicate UCI to a base station and scheduling may suffer. As a result, communications may become degraded.

According to various aspects described herein, a UE may be configured with instructions for transmitting UCI if PUCCH and PUSCH is transmitted on multiple panels. For example, the UE may have stored configuration information (e.g., associated with a standard) with instructions that direct the UE with how to transmit the UCI. The UE may also provide a UE capability information to a base station, and the base station may provide the instructions in a radio resource control (RRC) configuration message based at least in part on the UE capability information.

The UE may determine that a PUCCH transmitted on a first antenna panel of the UE is to overlap with a PUSCH transmitted on a second antenna panel of the UE based at least in part on DCI scheduling the PUCCH and the PUSCH. The UE may provide feedback to the base station in UCI, to help the base station determine whether downlink transmissions are received and/or learn of conditions related to receiving the transmissions. The UCI may include any of the ACK/NACK information, CSI report information and the scheduling request information. The UE may determine to transmit UCI on one or more of the PUCCH or the PUSCH when the PUCCH and the PUSCH overlap in time. For example, the UE may transmit UCI on the PUSCH and not on the PUCCH. If the PUCCH is a joint PUCCH which transmits UCI associated with different TRPs and overlaps with a PUSCH, the UE may transmit UCI associated with different TRPs on the joint PUCCH instead of on the PUSCH. A base station that transmitted the DCI may know how the UE is configured to transmit UCI and may receive the UCI based at least in part on how the UE is configured to transmit the UCI. Having received the UCI, the base station is able to schedule uplink channel transmissions. As a result, the UE and the base station avoid degraded communications for transmissions on the multiple panels of the UE.

As indicated above, FIG. 8 is provided as an example. Other examples may differ from what is described with regard to FIG. 8.

Figure 9:
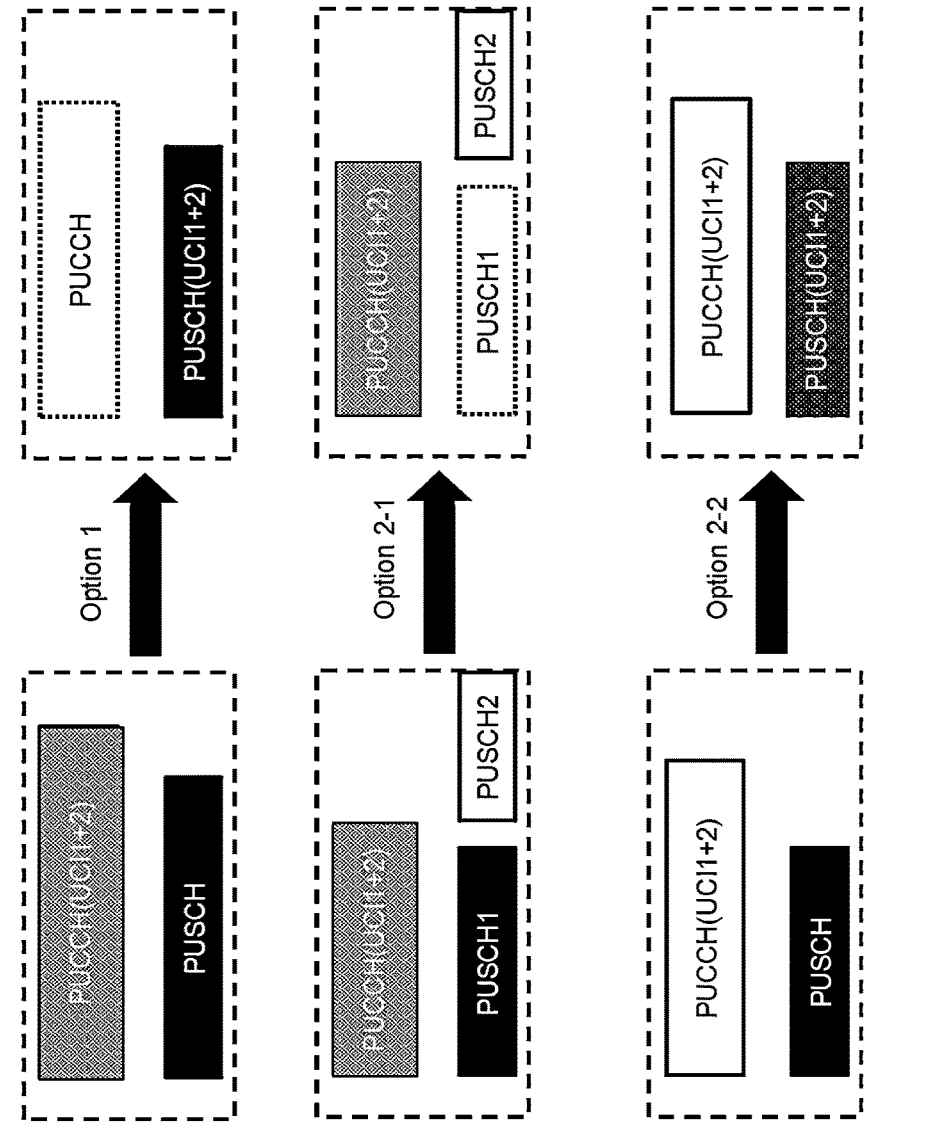
FIG. 9 illustrates an example of multiplexing uplink control information (UCI) for a UE with multiple antenna panels, in accordance with various aspects of the present disclosure.

FIG. 9 illustrates an example 900 of multiplexing UCI for a UE with multiple antenna panels, in accordance with various aspects of the present disclosure. FIG. 9 shows three options for UCI transmission involving a joint PUCCH.

Option 1 shows first DCI and second DCI scheduling on a joint PUCCH and a PUSCH that are to overlap in time. Uplink transmissions on the first panel of the UE are shown in FIG. 9 as a dark box, uplink transmissions on the second panel of the UE are shown as a white box with a solid line, and a joint PUCCH is shown with a shaded box. The cancelled uplink transmission is shown as a dashed line box. For this option, when a joint PUCCH with UCI associated with different TRPs overlaps with a PUSCH, the UE may transmit UCI for both the first DCI associated with the first TRP and for the second DCI associated with the second TRP on the overlapped PUSCH, the UE may not transmit UCI on the joint PUCCH and may cancel the PUCCH transmission.

Option 2-1 shows first DCI and second DCI scheduling a joint PUCCH and a PUSCH (PUSCH1) that are to overlap in time. Another PUSCH (PUSCH2) is scheduled but PUSCH2 does not overlap with the joint PUCCH. For this option, when a joint PUCCH with UCI associated with both the first DCI associated with the first TRP and the second DCI associated with the second TRP overlaps with a PUSCH, the UE may transmit UCI on the joint PUCCH, and the UE may cancel the PUSCH transmissions. The UE may not cancel PUSCH2 since PUSCH2 does not overlap with the joint PUCCH.

Option 2-2 shows first DCI and second DCI scheduling a joint PUCCH and a PUSCH that are to overlap in time. For this option, the UE may be enabled to simultaneously transmit PUCCH and PUSCH, and the UE may transmit UCI on the joint PUCCH and on the PUSCH.

In some aspects, each of the options may use a separate UE capability report and a separate RRC configuration. For example, the UE may indicate a UE capability for Option 1, a UE capability for Option 2-1, and/or a UE capability for Option 2-2. Correspondingly, the UE may receive an RRC configuration message for Option 1, an RRC configuration message for Option 2-1, and/or an RRC configuration message for Option 2-2.

As indicated above, FIG. 9 is provided as an example. Other examples may differ from what is described with regard to FIG. 9.

Figure 10:
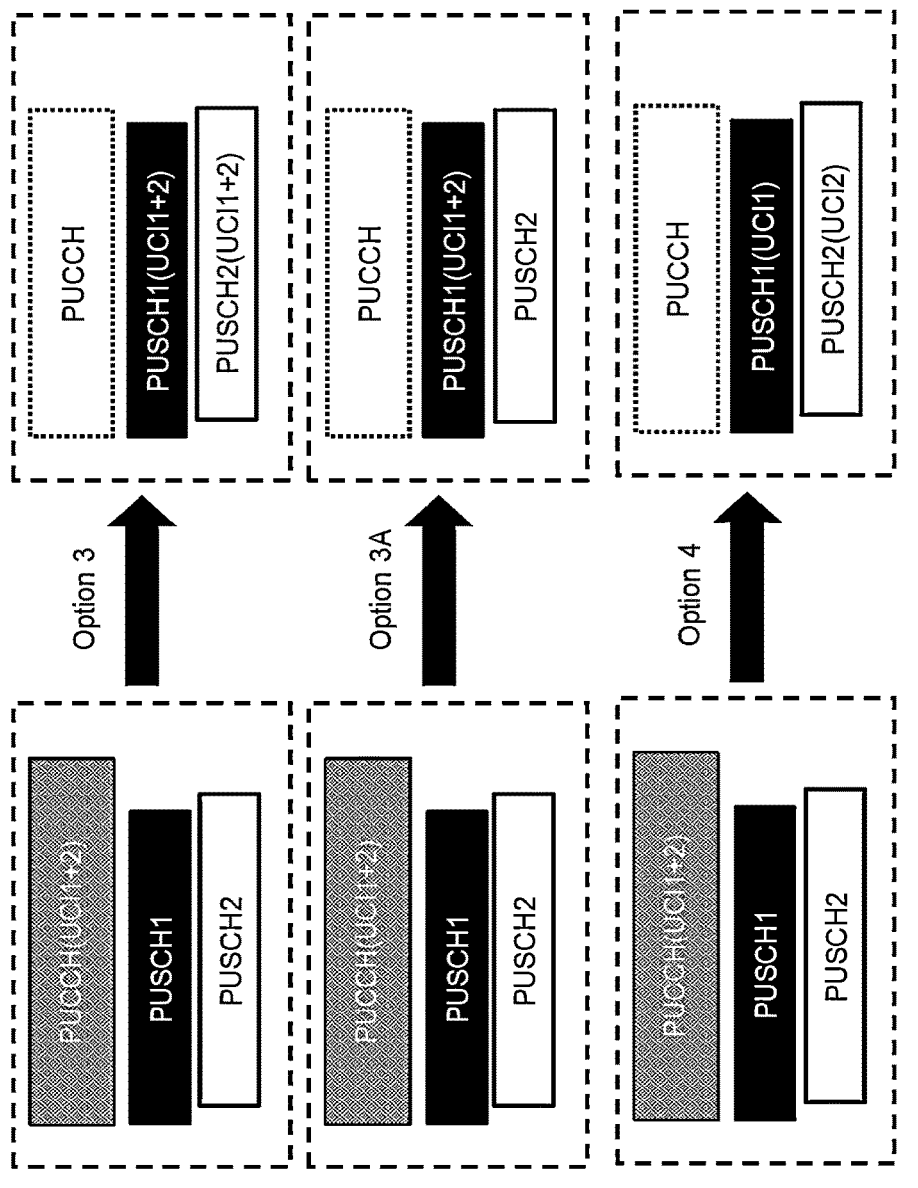
FIG. 10 illustrates an example of multiplexing UCI for a UE with multiple antenna panels, in accordance with various aspects of the present disclosure.

FIG. 10 illustrates an example 1000 of multiplexing UCI for a UE with multiple antenna panels, in accordance with various aspects of the present disclosure. FIG. 10 shows three more options for UCI transmission involving a joint PUCCH. In FIG. 10, the UE may have a PUSCH scheduled on each antenna panel.

Option 3 shows first DCI and second DCI scheduling a joint PUCCH and PUSCHs (PUSCH1 and PUSCH2) that are to overlap in time. Uplink transmissions on the first panel of the UE are shown in FIG. 10 as a dark box, uplink transmissions on the second panel of the UE are shown as a white box with a solid line, and joint PUCCH transmissions are shown with a shaded box. The cancelled uplink transmission is shown as a dashed line box. For this option, when a joint PUCCH with UCI for both the first DCI associated with the first TRP and the second DCI associated with the second TRP overlaps with multiple PUSCHs from different antenna panels, the UE may transmit UCI for both PUSCH1 and PUSCH2, and may cancel the joint PUCCH transmission.

Option 3A shows first DCI and second DCI scheduling a joint PUCCH, PUSCH1, and PUSCH2 that are to overlap in time. In some aspects, the UE may transmit UCI on PUSCH1 or PUSCH2 based at least in part on a starting position of each PUSCH. For example, the UE may transmit UCI on whichever PUSCH has an earliest starting symbol. In some aspects, when a joint PUCCH with UCI for both the first DCI associated with the first TRP and the second DCI associated with the second TRP overlaps with multiple PUSCHs from different antenna panels, the UE may transmit UCI on PUSCH1 or PUSCH2 based at least in part on a DMRS CDM group index or a frequency domain resource assignment (FDRA). For example, the UE may transmit UCI on whichever PUSCH has a or DMRS CDM group index lowest FDRA.

Option 4 shows first DCI and second DCI scheduling a joint PUCCH and a PUSCH that are to overlap in time. For this option, the UE may transmit UCI on a PUSCH that is associated with the same panel. For example, when a joint PUCCH with UCI for both the first DCI associated with the first TRP and the second DCI associated with the second TRP overlaps with multiple PUSCHs from different antenna panels, the UE may transmit UCI for the first DCI associated with the first TRP (e.g., UCI1) on PUSCH1, which is associated with the first panel because the first TRP may be associated with the first panel. UE may transmit UCI for the second DCI associated with the second TRP (e.g., UCI2) on PUSCH2, which is associated with the second panel because the second TRP may be associated with the second panel.

As indicated above, FIG. 10 is provided as an example. Other examples may differ from what is described with regard to FIG. 10.

FIG. 11 illustrates an example 1100 of multiplexing UCI for a UE with multiple antenna panels, in accordance with various aspects of the present disclosure. As shown in FIG. 11, example 1100 includes communication between a base station (BS) 1110 (e.g., a BS 110 depicted in FIGS. 1 and 2) and a UE 1120 (e.g., a UE 120 depicted in FIGS. 1 and 2). In some aspects, base station 1110 and UE 1120 may be included in a wireless network such as wireless network 100. Base station 1110 and UE 1120 may communicate on a wireless access link, which may include an uplink and a downlink.

As shown by reference number 1130, BS 1110 may transmit first DCI scheduling a PUCCH to be transmitted on a first panel of UE 1120 and second DCI scheduling a PUSCH to be transmitted on a second panel of UE 1130. In some aspects, the first DCI may be transmitted in a first CORESET, and the second DCI may be transmitted in a second CORESET. In some aspects, the second DCI may schedule multiple PUSCHs on multiple panels. In some aspects, the first DCI may schedule a joint PUCCH.

As shown by reference number 1135, UE 1120 may determine that the PUCCH is to overlap with the PUSCH based at least in part on the first DCI and the second DCI. UE 1120 may determine that the PUCCH is to overlap with the PUSCH based at least in part on a result of comparing resources that are assigned to the PUCCH and resources that are assigned to the PUSCH. If one or more of the resources align in time, frequency, and/or space, the PUCCH and the PUSCH are considered to overlap.

As shown by reference number 1140, UE 1120 may determine to transmit UCI on the PUCCH and/or the PUSCH based at least in part on determining that the PUCCH is to overlap with the PUSCH. The UCI may provide feedback to BS 1110 to help BS 1110 determine whether downlink transmissions are received and/or feedback about conditions related to receiving the transmissions. UE 1120 may determine on which channels to transmit UCI based at least in part on one or more of the aspects described in connection with FIGS. 9 and/or 10. For example, UE 1120 may receive DCI that schedules the UE to transmit a PUCCH on both the first panel and the second panel, which may be a joint PUCCH. UE 1120 may determine to transmit UCI on the PUSCH and not on the joint PUCCH, based at least in part on a configuration for transmitting UCI. UE 1120 may obtain the configuration from stored configuration information or from an RRC message from BS 1110. In some aspects, UE 1120 may transmit UCI on the joint PUCCH and not on the PUSCH.

As shown by reference number 1145, UE 1120 may transmit the UCI, associated with the first DCI and the second DCI, based at least in part on which channels UE 1120 determined for the UCI. BS 1110 may receive the UCI and schedule future transmissions on the PUCCH and/or on the PUSCH.

As indicated above, FIG. 10 is provided as an example. Other examples may differ from what is described with regard to FIG. 10.

FIG. 12 is a diagram illustrating an example process 1200 performed, for example, by a UE, in accordance with various aspects of the present disclosure. Example process 1200 is an example where the UE (e.g., UE 120, UE 1120 depicted in FIG. 11, and/or the like) performs operations associated with UCI multiplexing for multiple panels.

As shown in FIG. 12, in some aspects, process 1200 may include determining that a PUCCH transmitted on a first antenna panel of the UE is to overlap with a PUSCH transmitted on a second antenna panel of the UE based at least in part on DCI scheduling the PUCCH and the PUSCH (block 1210). For example, the UE (e.g., using receive processor 258, transmit processor 264, controller/processor 280, memory 282, and/or the like) may determine that a PUCCH transmitted on a first antenna panel of the UE is to overlap with a PUSCH transmitted on a second antenna panel of the UE based at least in part on DCI scheduling the PUCCH and the PUSCH, as described in connection with FIGS. 6-11.

As further shown in FIG. 12, in some aspects, process 1200 may include determining to transmit UCI on one or more of the PUCCH or the PUSCH based at least in part on determining that the PUCCH is to overlap with the PUSCH (block 1220). For example, the UE (e.g., using receive processor 258, transmit processor 264, controller/processor

280, memory 282, and/or the like) may determine to transmit UCI on one or more of the PUCCH or the PUSCH based at least in part on determining that the PUCCH is to overlap with the PUSCH, as described above in connection with FIGS. 6-11.

As further shown in FIG. 12, in some aspects, process 1200 may include transmitting the UCI on one or more of the PUCCH or the PUSCH based at least in part on determining to transmit the UCI on one or more of the PUCCH or the PUSCH (block 1230). For example, the UE (e.g., using receive processor 258, transmit processor 264, controller/processor 280, memory 282, and/or the like) may transmit the UCI on one or more of the PUCCH or the PUSCH based at least in part on determining to transmit the UCI on one or more of the PUCCH or the PUSCH, as described above in connection with FIGS. 6-11.

Process 1200 may include additional aspects, such as any single aspect or any combination of aspects described below and/or in connection with one or more other processes described elsewhere herein.

In a first aspect, the PUCCH is a joint PUCCH transmitted by both the first antenna panel and the second antenna panel.

In a second aspect, alone or in combination with the first aspect, determining whether to transmit the UCI on one or more of the PUCCH or the PUSCH includes determining to transmit the UCI on the PUSCH and to refrain from transmitting the UCI on the joint PUCCH.

In a third aspect, alone or in combination with one or more of the first and second aspects, determining whether to transmit the UCI on one or more of the PUCCH or the PUSCH includes determining to transmit the UCI on the joint PUCCH and to refrain from transmitting the UCI on the PUSCH.

In a fourth aspect, alone or in combination with one or more of the first through third aspects, simultaneous beam transmission for PUCCH and PUSCH is enabled, and determining whether to transmit the UCI on one or more of the PUCCH or the PUSCH includes determining to transmit the UCI on the joint PUCCH and the PUSCH.

In a fifth aspect, alone or in combination with one or more of the first through fourth aspects, process 1200 includes transmitting an indication of a UE capability for transmitting the UCI on one or more of the PUCCH or the PUSCH.

In a sixth aspect, alone or in combination with one or more of the first through fifth aspects, process 1200 includes receiving a radio resource control configuration message indicating that the UCI is to be transmitted on one or more of the PUCCH or the PUSCH.

In a seventh aspect, alone or in combination with one or more of the first through sixth aspects, the PUCCH is a joint PUCCH transmitted by both the first antenna panel and the second antenna panel, and the joint PUCCH is to overlap with a first PUSCH transmitted by the first antenna panel and a second PUSCH transmitted by the second antenna panel.

In an eighth aspect, alone or in combination with one or more of the first through seventh aspects, determining whether to transmit the UCI on one or more of the PUCCH or the PUSCH includes determining to transmit the UCI on the first PUSCH and the second PUSCH and to refrain from transmitting the UCI on the joint PUCCH.

In a ninth aspect, alone or in combination with one or more of the first through eighth aspects, determining whether to transmit the UCI on one or more of the PUCCH or the PUSCH includes determining to transmit the UCI on one of the first PUSCH or the second PUSCH based at least in part on an earliest starting symbol among a starting symbol of the first PUSCH and a starting symbol of the second PUSCH.

In a tenth aspect, alone or in combination with one or more of the first through ninth aspects, determining whether to transmit the UCI on one or more of the PUCCH or the PUSCH includes determining to transmit the UCI on one of the first PUSCH or the second PUSCH based at least in part on a lowest DMRS CDM group among a DMRS CDM group of the first PUSCH and a DMRS CDM group of the second PUSCH.

In an eleventh aspect, alone or in combination with one or more of the first through tenth aspects, determining whether to transmit the UCI on one or more of the PUCCH or the PUSCH includes determining to transmit the UCI on one of the first PUSCH or the second PUSCH based at least in part on a lowest FDRA among an FDRA of the first PUSCH and an FDRA of the second PUSCH.

In a twelfth aspect, alone or in combination with one or more of the first through eleventh aspects, determining whether to transmit the UCI on one or more of the PUCCH or the PUSCH includes determining to transmit the UCI on one of the first PUSCH or the second PUSCH, based at least in part on whether the UCI is associated with the first antenna panel or the second antenna panel.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
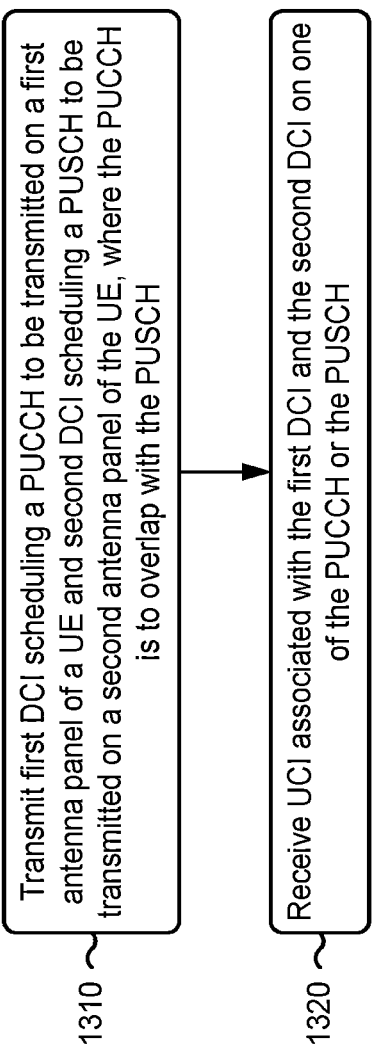
FIG. 13 is a diagram illustrating an example process performed, for example, by a base station, in accordance with various aspects of the present disclosure.

FIG. 13 is a diagram illustrating an example process 1300 performed, for example, by a base station, in accordance with various aspects of the present disclosure. Example process 1300 is an example where the base station (e.g., base station 110 depicted in FIGS. 1 and 2, BS 1110 depicted in FIG. 11, and/or the like) performs operations associated with UCI multiplexing for multiple panels.

As shown in FIG. 13, in some aspects, process 1300 may include transmitting first DCI scheduling a PUCCH to be transmitted on a first antenna panel of a UE and second DCI scheduling a PUSCH to be transmitted on a second antenna panel of the UE (block 1310). For example, the base station (e.g., using transmit processor 220, receive processor 238, controller/processor 240, memory 242, and/or the like) may transmit first DCI scheduling a PUCCH to be transmitted on a first antenna panel of a UE and second DCI scheduling a PUSCH to be transmitted on a second antenna panel of the UE, as described above in connection with FIGS. 6-11. In some aspects, the PUCCH is to overlap with the PUSCH.

As further shown in FIG. 13, in some aspects, process 1300 may include receiving UCI associated with the first DCI and the second DCI on one of the PUCCH or the PUSCH (block 1320). For example, the base station (e.g., using transmit processor 220, receive processor 238, controller/processor 240, memory 242, and/or the like) may receive UCI associated with the first DCI and the second DCI on one of the PUCCH or the PUSCH, as described above in connection with FIGS. 6-11.

Process 1300 may include additional aspects, such as any single aspect or any combination of aspects described below and/or in connection with one or more other processes described elsewhere herein.

In a first aspect, process 1300 includes transmitting the first DCI and the second DCI includes indicating a joint feedback mode for the UE, and wherein the PUCCH is a joint PUCCH transmitted by both the first antenna panel of the UE and the second antenna panel of the UE.

In a second aspect, alone or in combination with the first aspect, receiving the UCI includes receiving the UCI on the PUSCH and not on the joint PUCCH.

In a third aspect, alone or in combination with one or more of the first and second aspects, receiving the UCI includes receiving the UCI on the joint PUCCH and not on the PUSCH.

In a fourth aspect, alone or in combination with one or more of the first through third aspects, process 1300 includes receiving the UCI include receiving the UCI on the joint PUCCH, where the joint PUCCH overlaps with a first PUSCH received from the first antenna panel of the UE and a second PUSCH received from the second antenna panel.

In a fifth aspect, alone or in combination with one or more of the first through fourth aspects, process 1300 includes receiving, from the UE, an indication of a UE capability for transmitting the UCI on one or more of the PUCCH or the PUSCH.

In a sixth aspect, alone or in combination with one or more of the first through fifth aspects, process 1300 includes transmitting, to the UE, a radio resource control configuration message indicating that the UCI is to be transmitted on one or more of the PUCCH or the PUSCH.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
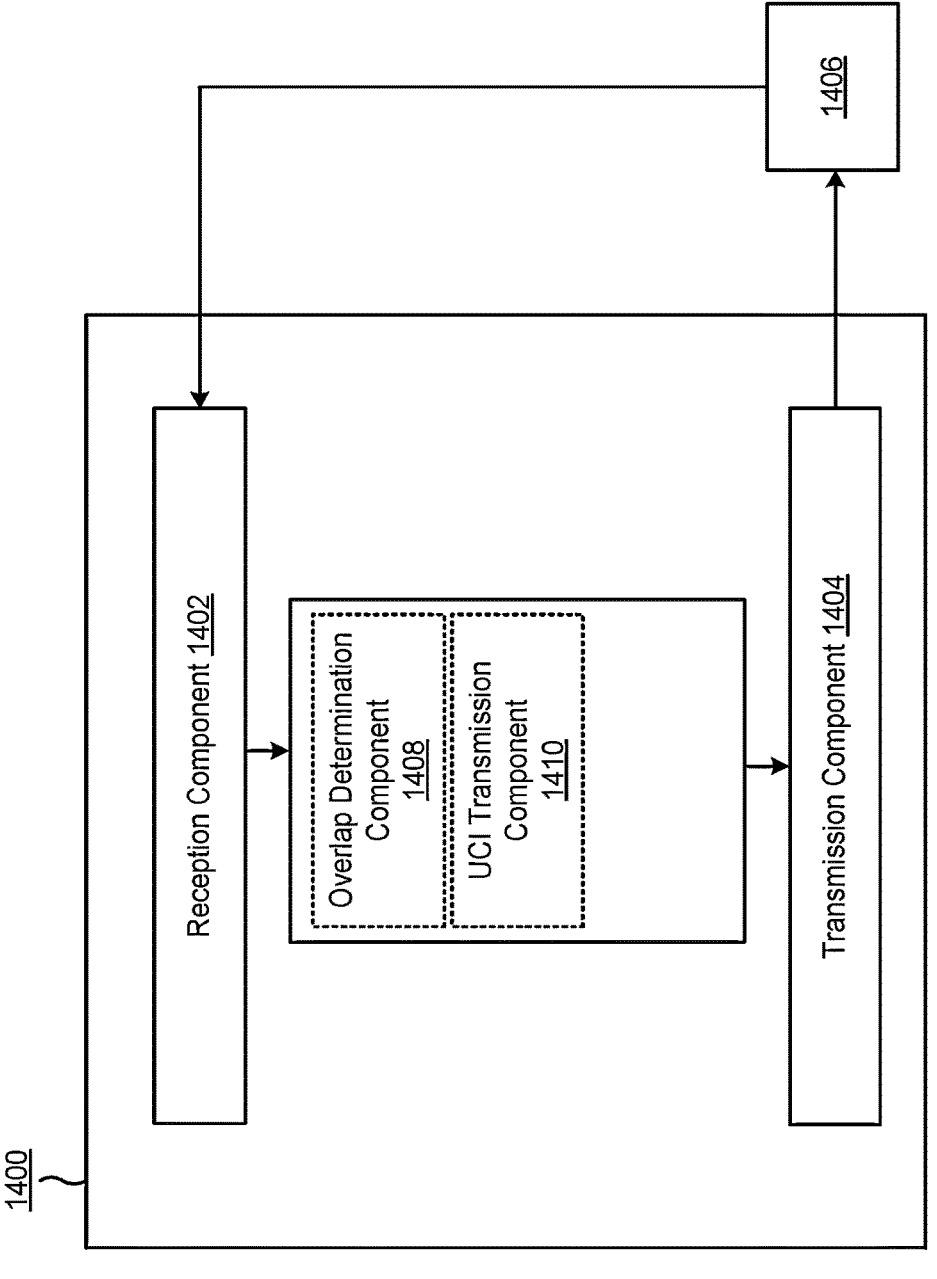
FIG. 14 is a block diagram of an example apparatus for wireless communication.

FIG. 14 is a block diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include one or more of an overlap determination component 1408, or a UCI transmission component 1410, among other examples.

In some aspects, the apparatus 1400 may be configured to perform one or more operations described herein in connection with FIGS. 6-13. Additionally or alternatively, the apparatus 1400 may be configured to perform one or more processes described herein, such as process 1200 of FIG. 12. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be collocated with the reception component 1402 in a transceiver.

The overlap determination component 1408 may determine that a PUCCH transmitted on a first antenna panel of the UE is to overlap with a PUSCH transmitted on a second antenna panel of the UE based at least in part on DCI scheduling the PUCCH and the PUSCH. The UCI transmission determination component 1410 may determine to transmit UCI on one or more of the PUCCH or the PUSCH based at least in part on determining that the PUCCH is to overlap with the PUSCH. The transmission component 1404 may transmit the UCI on one or more of the PUCCH or the PUSCH based at least in part on determining to transmit the UCI on one or more of the PUCCH or the PUSCH.

The overlap determination component 1408 may include a memory. The overlap determination component 1408 may one or more processors operatively coupled to the memory, the memory and the one or more processors configured to determine that a PUCCH transmitted on a first antenna panel of the UE is to overlap with a PUSCH transmitted on a second antenna panel of the UE based at least in part on DCI scheduling the PUCCH and the PUSCH.

The UCI transmission component 1410 may include a memory. The overlap determination component 1408 may one or more processors operatively coupled to the memory, the memory and the one or more processors configured to determine to transmit UCI on one or more of the PUCCH or the PUSCH based at least in part on determining that the PUCCH is to overlap with the PUSCH.

The overlap determination component 1408 may include one or more instructions that, when executed by one or more processors of a UE, cause the UE to determine that a PUCCH transmitted on a first antenna panel of the UE is to overlap with a PUSCH transmitted on a second antenna panel of the UE based at least in part on DCI scheduling the PUCCH and the PUSCH.

The UCI transmission component 1410 may include one or more instructions that, when executed by one or more processors of a UE, cause the UE to determine to transmit UCI on one or more of the PUCCH or the PUSCH based at least in part on determining that the PUCCH is to overlap with the PUSCH.

The overlap determination component 1408 may include means for determining that a PUCCH transmitted on a first antenna panel of the apparatus is to overlap with a PUSCH transmitted on a second antenna panel of the apparatus based at least in part on DCI scheduling the PUCCH and the PUSCH. The UCI transmission component 1410 may include means for determining to transmit UCI on one or more of the PUCCH or the PUSCH based at least in part on determining that the PUCCH is to overlap with the PUSCH.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally or alternatively, a set of (one or more) components shown in FIG. 14 may perform one or more functions described as being performed by another set of components shown in FIG. 14.

Figure 15:
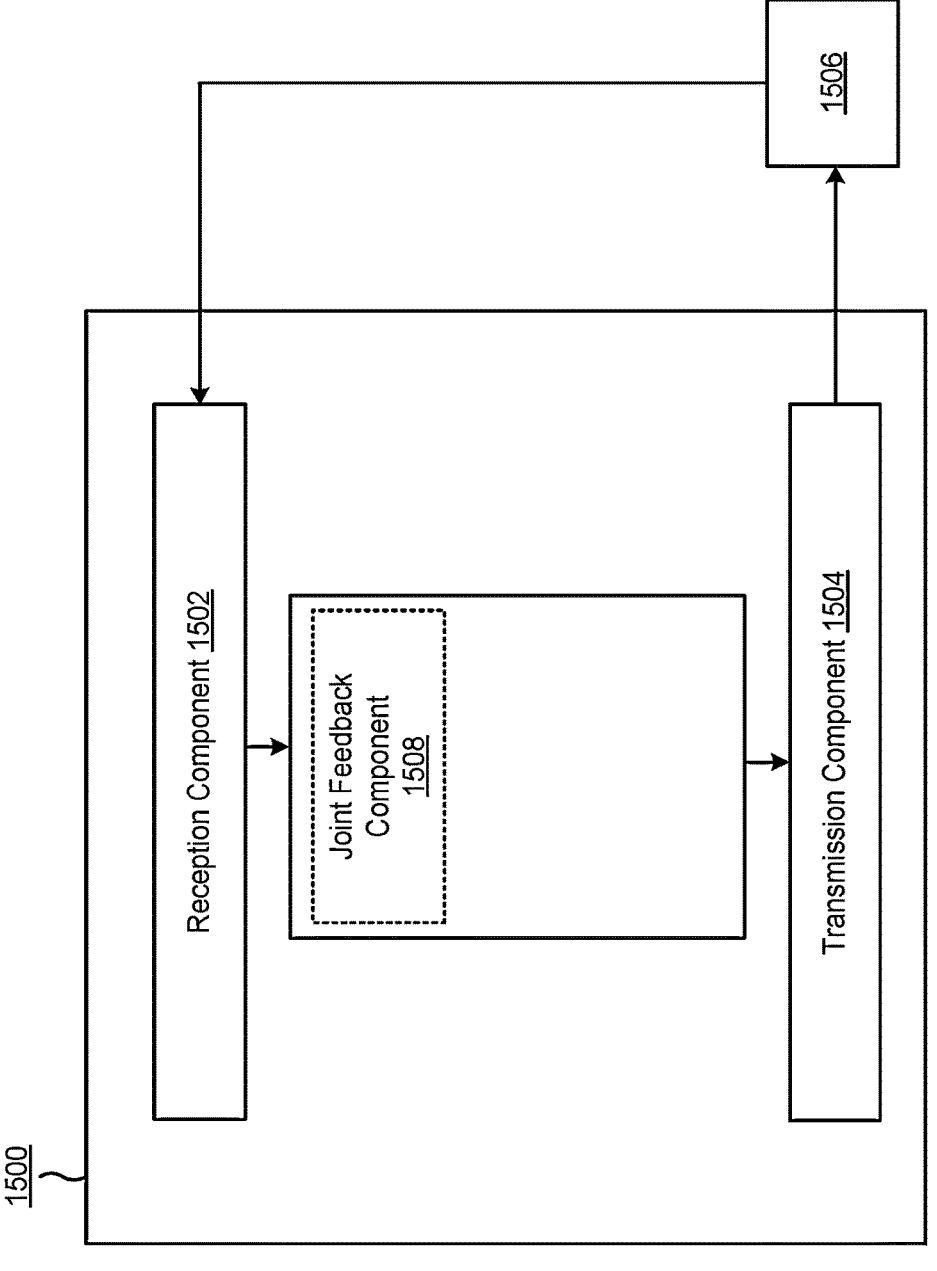
FIG. 15 is a block diagram of an example apparatus for wireless communication.

FIG. 15 is a block diagram of an example apparatus 1500 for wireless communication. The apparatus 1500 may be a base station, or a base station may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a joint feedback component 1508, among other examples.

In some aspects, the apparatus 1500 may be configured to perform one or more operations described herein in connection with FIGS. 6-13. Additionally or alternatively, the apparatus 1500 may be configured to perform one or more processes described herein, such as process 1300 of FIG. 13. In some aspects, the apparatus 1500 and/or one or more components shown in FIG. 15 may include one or more components of the base station described above in connection with FIG. 2. Additionally, or alternatively, one or more components shown in FIG. 15 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the base station described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the base station described above in connection with FIG. 2. In some aspects, the transmission component 1504 may be collocated with the reception component 1502 in a transceiver.

The transmission component 1504 may transmit first DCI scheduling a PUCCH to be transmitted on a first antenna panel of a UE and second DCI scheduling a PUSCH to be transmitted on a second antenna panel of the UE, where the PUCCH is to overlap with the PUSCH. The reception component 1502 may receive UCI associated with the first DCI and the second DCI on one of the PUCCH or the PUSCH.

The joint feedback component 1508 may indicate a joint feedback mode for the UE, and the PUCCH may be a joint PUCCH transmitted by both the first antenna panel of the UE and the second antenna panel of the UE.

The joint feedback component 1508 may include a memory. The joint feedback component 1508 may include one or more processors operatively coupled to the memory, the memory and the one or more processors configured to indicate a joint feedback mode for the UE, and the PUCCH may be a joint PUCCH transmitted by both the first antenna panel of the UE and the second antenna panel of the UE.

The joint feedback component 1508 may include one or more instructions that, when executed by one or more processors of a base station, cause the base station to indicate a joint feedback mode for the UE, and the PUCCH may be a joint PUCCH transmitted by both the first antenna panel of the UE and the second antenna panel of the UE.

The transmission component 1504 may include means for transmitting first DCI scheduling a PUCCH to be transmitted on a first antenna panel of a UE and second DCI scheduling a PUSCH to be transmitted on a second antenna panel of the UE, where the PUCCH is to overlap with the PUSCH. The reception component 1502 may include means for receiving UCI associated with the first DCI and the second DCI on one of the PUCCH or the PUSCH. The joint feedback component 1508 may include means for indicating a joint feedback mode for the UE, and the PUCCH may be a joint PUCCH transmitted by both the first antenna panel of the UE and the second antenna panel of the UE.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally or alternatively, a set of (one or more) components shown in FIG. 15 may perform one or more functions described as being performed by another set of components shown in FIG. 15.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
  determining that a physical uplink control channel (PUCCH) transmitted on a first antenna panel of the UE is to overlap with a physical uplink shared channel (PUSCH) transmitted on a second antenna panel of the UE based at least in part on downlink control information (DCI) scheduling the PUCCH and the PUSCH, wherein the PUCCH is a joint PUCCH transmitted by both the first antenna panel and the second antenna panel;
  determining to transmit uplink control information (UCI) on one or more of the PUCCH or the PUSCH based at least in part on determining that the PUCCH is to overlap with the PUSCH; and
  transmitting the UCI on one or more of the PUCCH or the PUSCH based at least in part on determining to transmit the UCI on one or more of the PUCCH or the PUSCH.

2. The method of claim 1, wherein determining whether to transmit the UCI on one or more of the PUCCH or the PUSCH includes determining to transmit the UCI on the PUSCH and to refrain from transmitting the UCI on the joint PUCCH.

3. The method of claim 1, wherein determining whether to transmit the UCI on one or more of the PUCCH or the PUSCH includes determining to transmit the UCI on the joint PUCCH and to refrain from transmitting the UCI on the PUSCH.

4. The method of claim 1, wherein simultaneous beam transmission for PUCCH and PUSCH is enabled, and wherein determining whether to transmit the UCI on one or more of the PUCCH or the PUSCH includes determining to transmit the UCI on the joint PUCCH and the PUSCH.

5. The method of claim 1, further comprising transmitting an indication of a UE capability for transmitting the UCI on one or more of the PUCCH or the PUSCH.

6. The method of claim 1, further comprising receiving a radio resource control configuration message indicating that the UCI is to be transmitted on one or more of the PUCCH or the PUSCH.

7. The method of claim 1, wherein the joint PUCCH is to overlap with a first PUSCH transmitted by the first antenna panel and a second PUSCH transmitted by the second antenna panel.

8. The method of claim 7, wherein determining whether to transmit the UCI on one or more of the PUCCH or the PUSCH includes determining to transmit the UCI on the first PUSCH and the second PUSCH and to refrain from transmitting the UCI on the joint PUCCH.

9. The method of claim 7, wherein determining whether to transmit the UCI on one or more of the PUCCH or the PUSCH includes determining to transmit the UCI on one of the first PUSCH or the second PUSCH based at least in part on an earliest starting symbol among a starting symbol of the first PUSCH and a starting symbol of the second PUSCH.

10. The method of claim 7, wherein determining whether to transmit the UCI on one or more of the PUCCH or the PUSCH includes determining to transmit the UCI on one of the first PUSCH or the second PUSCH based at least in part on a lowest demodulation reference signal (DMRS) code division multiplexing (CDM) group among a DMRS CDM group of the first PUSCH and a DMRS CDM group of the second PUSCH.

11. The method of claim 7, wherein determining whether to transmit the UCI on one or more of the PUCCH or the PUSCH includes determining to transmit the UCI on one of the first PUSCH or the second PUSCH based at least in part on a lowest frequency domain resource assignment (FDRA) among an FDRA of the first PUSCH and an FDRA of the second PUSCH.

12. The method of claim 7, wherein determining whether to transmit the UCI on one or more of the PUCCH or the PUSCH includes determining to transmit the UCI on one of the first PUSCH or the second PUSCH, based at least in part on whether the UCI is associated with the first antenna panel or the second antenna panel.

13. A method of wireless communication performed by a base station, comprising:
  transmitting first downlink control information (DCI) scheduling a physical uplink control channel (PUCCH) to be transmitted on a first antenna panel of a user equipment (UE) and second DCI scheduling a physical uplink shared channel (PUSCH) to be transmitted on a second antenna panel of the UE, wherein the PUCCH is to overlap with the PUSCH, wherein the PUCCH is a joint PUCCH transmitted by both the first antenna panel of the UE and the second antenna panel of the UE; and
  receiving uplink control information (UCI) associated with the first DCI and the second DCI on one of the PUCCH or the PUSCH.

14. The method of claim 13, wherein transmitting the first DCI and the second DCI includes indicating a joint feedback mode for the UE.

15. The method of claim 14, wherein receiving the UCI includes receiving the UCI on the PUSCH and not on the joint PUCCH.

16. The method of claim 14, wherein receiving the UCI includes receiving the UCI on the joint PUCCH and not on the PUSCH.

17. The method of claim 14, wherein receiving the UCI include receiving the UCI on the joint PUCCH, wherein the joint PUCCH overlaps with a first PUSCH received from the first antenna panel of the UE and a second PUSCH received from the second antenna panel.

18. The method of claim 13, further comprising receiving, from the UE, an indication of a UE capability for transmitting the UCI on one or more of the PUCCH or the PUSCH.

19. The method of claim 13, further comprising transmitting, to the UE, a radio resource control configuration message indicating that the UCI is to be transmitted on one or more of the PUCCH or the PUSCH.

20. A user equipment (UE) for wireless communication, comprising:
  memory; and
  one or more processors coupled to the memory, the one or more processors configured to:
    determine that a physical uplink control channel (PUCCH) transmitted on a first antenna panel of the UE is to overlap with a physical uplink shared channel (PUSCH) transmitted on a second antenna panel of the UE based at least in part on downlink control information (DCI) scheduling the PUCCH and the PUSCH, wherein the PUCCH is a joint PUCCH transmitted by both the first antenna panel and the second antenna panel;

determine to transmit uplink control information (UCI) on one or more of the PUCCH or the PUSCH based at least in part on determining that the PUCCH is to overlap with the PUSCH; and transmit the UCI on one or more of the PUCCH or the PUSCH based at least in part on determining to transmit the UCI on one or more of the PUCCH or the PUSCH.

21. The UE of claim 20, wherein the one or more processors, when determining whether to transmit the UCI on one or more of the PUCCH or the PUSCH, are configured to determine to transmit the UCI on the PUSCH and to refrain from transmitting the UCI on the joint PUCCH.

22. The UE of claim 20, wherein the one or more processors, when determining whether to transmit the UCI on one or more of the PUCCH or the PUSCH, are configured to determine to transmit the UCI on the joint PUCCH and to refrain from transmitting the UCI on the PUSCH.

23. The UE of claim 20, wherein simultaneous beam transmission for PUCCH and PUSCH is enabled, and wherein determining whether to transmit the UCI on one or more of the PUCCH or the PUSCH includes determining to transmit the UCI on the joint PUCCH and the PUSCH.

24. The UE of claim 20, wherein the one or more processors are further configured to transmit an indication of a UE capability for transmitting the UCI on one or more of the PUCCH or the PUSCH.

25. The UE of claim 20, wherein the one or more processors are further configured to receive a radio resource control configuration message indicating that the UCI is to be transmitted on one or more of the PUCCH or the PUSCH.

26. The UE of claim 20, wherein the joint PUCCH is to overlap with a first PUSCH transmitted by the first antenna panel and a second PUSCH transmitted by the second antenna panel.

27. A base station for wireless communication, comprising:

memory; and one or more processors coupled to the memory, the one or more processors configured to:

transmit first downlink control information (DCI) scheduling a physical uplink control channel (PUCCH) to be transmitted on a first antenna panel of a user equipment (UE) and second DCI scheduling a physical uplink shared channel (PUSCH) to be transmitted on a second antenna panel of the UE, wherein the PUCCH is to overlap with the PUSCH, wherein the PUCCH is a joint PUCCH transmitted by both the first antenna panel of the UE and the second antenna panel of the UE; and receive uplink control information (UCI) associated with the first DCI and the second DCI on one of the PUCCH or the PUSCH.

28. The base station of claim 27, wherein the one or more processors, when transmitting the first DCI and the second DCI, are configured to indicate a joint feedback mode for the UE.

29. The UE of claim 26, wherein determining whether to transmit the UCI on one or more of the PUCCH or the PUSCH includes determining to transmit the UCI on the first PUSCH and the second PUSCH and to refrain from transmitting the UCI on the joint PUCCH.

30. The UE of claim 26, wherein determining whether to transmit the UCI on one or more of the PUCCH or the PUSCH includes determining to transmit the UCI on one of the first PUSCH or the second PUSCH based at least in part on an earliest starting symbol among a starting symbol of the first PUSCH and a starting symbol of the second PUSCH.

* * * * *